E. W. TILTON.
CIRCULAR-SAW.
No. 191,198. Patented May 22, 1877.
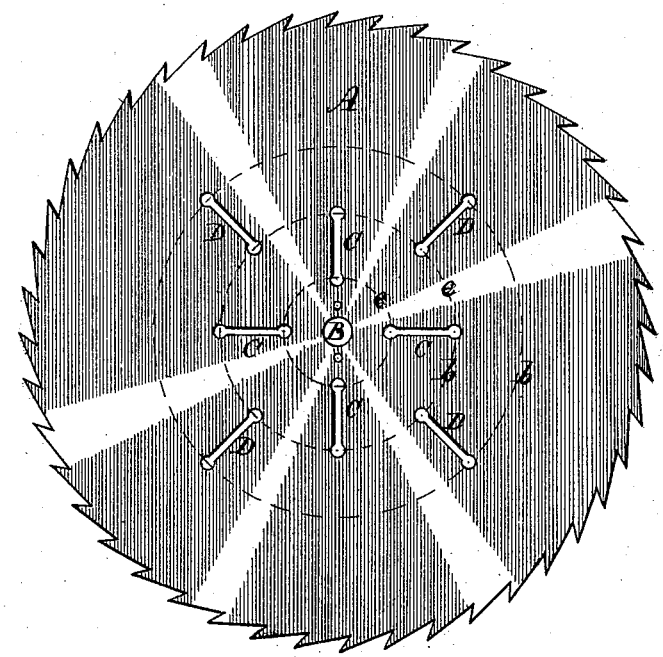
Witnesses;
Grenville Lewis
C. M. Kenny.
Inventor;
Edward W. Tilton
By Hill & Ellsworth
His Attys.

UNITED STATES PATENT OFFICE.

EDWARD W. TILTON, OF OSHKOSH, WISCONSIN, ASSIGNOR OF ONE-HALF HIS RIGHT TO JOSEPH W. BRANCH, OF ST. LOUIS, MISSOURI.

IMPROVEMENT IN CIRCULAR SAWS.

Specification forming part of Letters Patent No. 191,198, dated May 22, 1877; application filed April 28, 1876.

*To all whom it may concern:*

Be it known that I, EDWARD W. TILTON, of Oshkosh, Winnebago county, and State of Wisconsin, have invented an Improvement in Circular Saws; and I do hereby declare the following to be a full, clear, and exact description of the same, reference being had to the accompanying drawing, forming part of this specification, in which the figure is a side elevation of the saw.

My invention has for its object to improve the construction of circular saws for the purpose of preventing them from being warped by heat.

To this end the invention consists, first, in forming or providing the saw with openings between the eye and periphery which shall take up the expansion and prevent it from injuriously influencing the running of the saw; and, secondly, in a special form and arrangement of such openings, to wit, two sets of radial slots or openings, the slots of one set being arranged equidistant from each other near the eye of the saw, and those of the other set being similarly arranged, but farther removed from the eye of the saw toward its outer edge, as I will now proceed to describe.

In the accompanying drawing, A is the saw, formed with the center eye B, to receive the mandrel.

Between the eye and periphery of the saw I form a series of openings, arranged in any suitable manner.

One method of carrying out this invention is shown in the figure, wherein C C represent radial slots, preferably four in number, cut through the saw, with their inner ends removed some distance from the eye of the saw, as shown.

D D are the slots constituting the outer series, also four in number by preference, and cut through the saw at a greater distance from its eye than the slots C. The slots of each set are of the same length, but while those of one set may be longer than those of the other set, still they may also be of equal length, if required.

The slots of each set may lie in such relation to each other that their outer and inner ends will be touched by circular lines drawn upon the saw concentric with its eye—that is to say, the inner set of slots lies radially between two concentric lines, $e\ e$, and the outer set lies radially between two concentric lines $b\ b$. The inner ends of the outer set enter the outer circle of the inner set, and vice versa, to prevent the weakening of the saw-plate, and at the same time so dispose the cuts as to secure the best results.

Instead of the slots small holes may be made in line with each other, as will be readily understood.

I claim as my invention—

1. A circular saw provided with openings between the eye and periphery to prevent the warping or buckling of the saw when expanded by heat, substantially as described.

2. A circular saw having two sets of radial slots or holes cut through it, one set being farther removed from the eye than the other set, substantially as described, for the purposes specified.

EDWARD W. TILTON.

Witnesses:
JABEZ FOWLER,
JOHN W. YORK.